July 5, 1932.   H. R. TRAPHAGEN   1,865,651
MOUNTING FOR CULTIVATOR SHOVELS AND THE LIKE
Filed Aug. 12, 1929    2 Sheets-Sheet 1
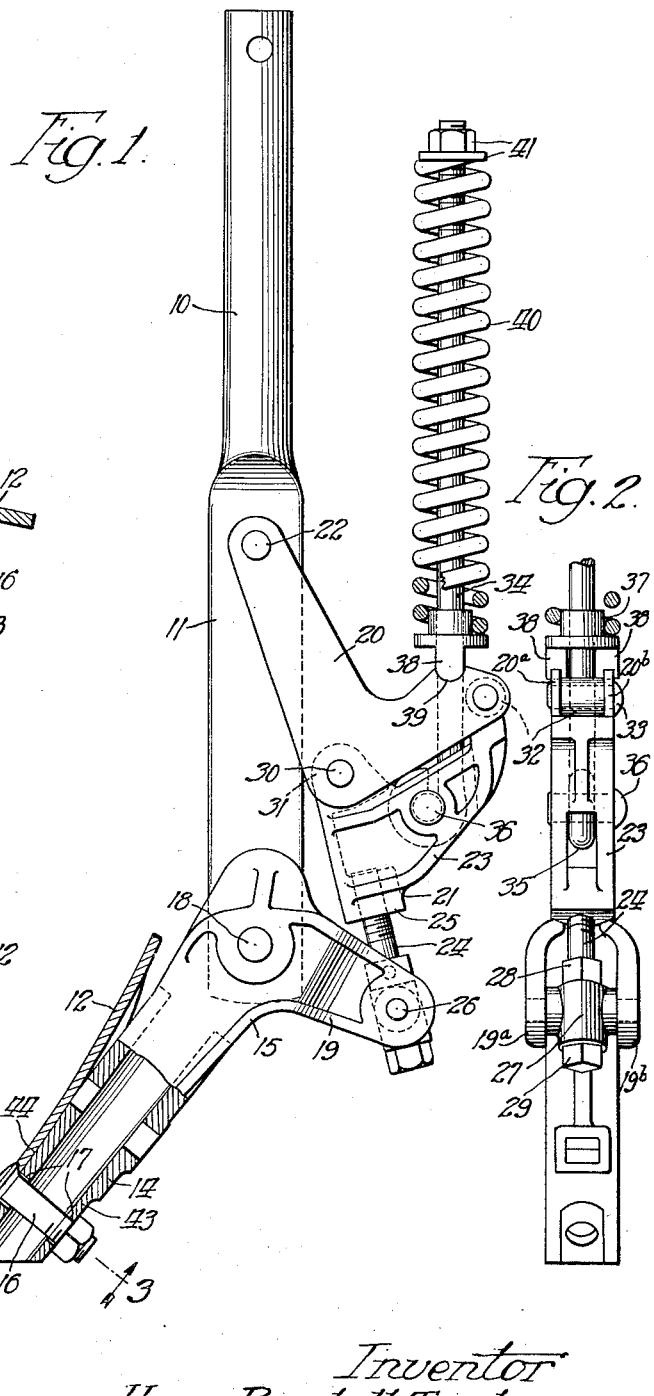
Inventor
Harry Randall Traphagen
By: Fisher, Clapp, Soans & Pond Attys.

July 5, 1932.  H. R. TRAPHAGEN  1,865,651
MOUNTING FOR CULTIVATOR SHOVELS AND THE LIKE
Filed Aug. 12, 1929    2 Sheets-Sheet 2
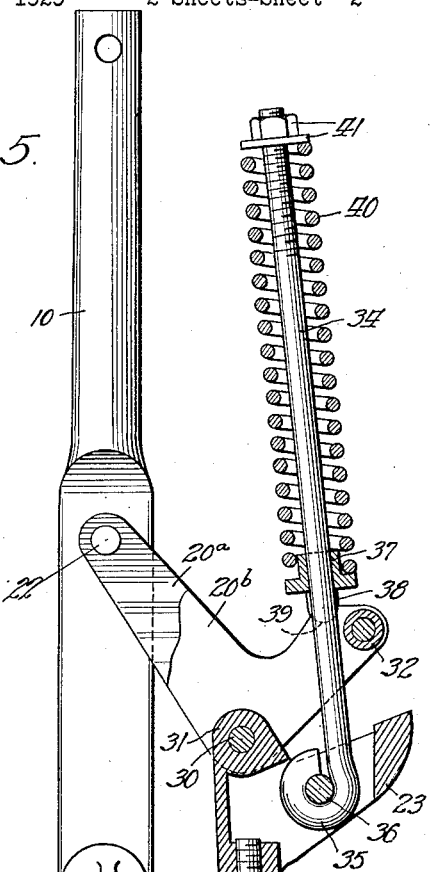
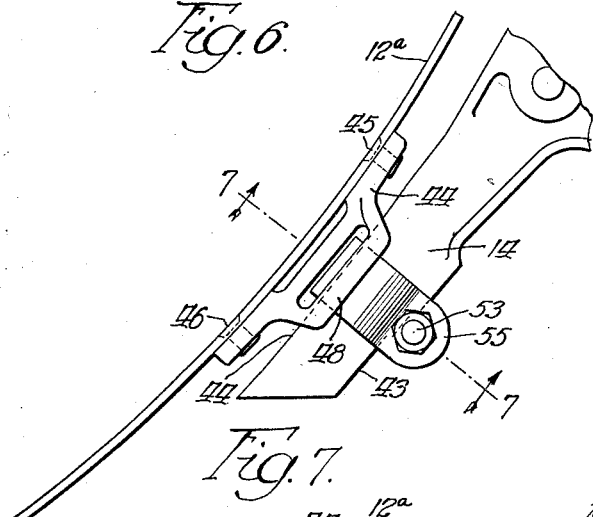
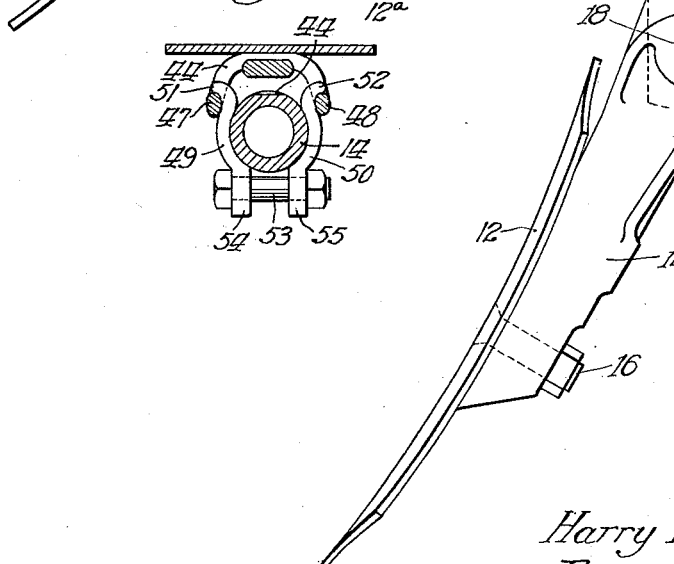
Inventor
Harry Randall Traphagen Patented July 5, 1932

1,865,651

UNITED STATES PATENT OFFICE

HARRY RANDALL TRAPHAGEN, OF ROCKFORD, ILLINOIS, ASSIGNOR TO J. I. CASE COMPANY, OF RACINE, WISCONSIN, A CORPORATION OF WISCONSIN

MOUNTING FOR CULTIVATOR SHOVELS AND THE LIKE

Application filed August 12, 1929. Serial No. 385,283.

This invention relates to an improved means for mounting cultivator shovels and the like so as to permit the shovel to yield rearwardly when the same engages an obstruction in its path of travel, thereby to prevent possible bending, breaking or otherwise damaging the shovel or other parts of the implement.

The principal objects of the invention are to provide means for yieldably mounting the shovel or other earth turning body, which means will be effective to hold the shovel firmly in operative position while at the same time permitting yielding of the shovel when a comparatively rigid obstruction is engaged; to provide means whereby the normal operative position of the shovel can be adjusted to the desired position; to provide a mounting means to which a shovel may be secured either by means of a bolt extending through the body of the shovel and through the stem or post of the mounting means, or by means of a clamping device, both of these forms being more or less standardized construction; and in general, it is the object of my invention to provide an improved mounting means of the class described.

Other objects and advantages of my invention will be understood by reference to the following specification and accompanying two sheets of drawings in which I have illustrated a selected embodiment of my improved means for mounting a cultivator shovel.

In the drawings:

Fig. 1 is a side elevation, certain parts being shown in section to facilitate illustration.

Fig. 2 is a rear elevation of a part of Fig. 1.

Fig. 3 is a section on the line 3—3 of Fig. 1.

Fig. 4 is a perspective of a cultivator shovel provided with an opening extending therethrough whereby the same is adapted to be secured to the mounting means through the agency of a bolt.

Fig. 5 is a side elevation similar to Fig. 1 but showing parts in changed position and certain parts being shown in section to more fully illustrate the details of the construction.

Fig. 6 is a side elevation of a cultivator shovel having a clamp-on means for mounting the same on the stem or post of the mounting means, and Fig. 7 is a section on the line 7—7 of Fig. 6.

Referring now to the drawings, I have shown a depending post or bracket member 10 which, it will be understood, is a part secured in any suitable manner to the frame work of a cultivator or like implement. The bracket 10 is a normally fixed or stationary member although the same may be mounted for vertical or other adjustment in accordance with well known practice. The lower end 11 of the bracket is flattened and a cultivator shovel 12 is secured thereto through the agency of a yieldable mechanism which I will now describe.

The shovel 12, being of the type shown in Fig. 4 which embodies a square or rectangular opening 13 is secured to the stem or post part 14 of a bell crank or foot crank 15 by means of a bolt and nut 16 which extends through the opening 13 and through suitable openings 17 in the said stem or arm 14. The bell crank 15 is pivoted intermediate its ends as at 18 to the lower end of the bracket 10 so that the other arm 19 of the bell crank extends rearwardly of the said bracket. The arm 19 is connected to the bracket 10 by means pivoted to the arm adjacent its end and extending to a point in the bracket spaced above the pivotal connection 18 between the bell crank 15 and the bracket 10.

The last mentioned connecting means includes a pair of bell crank members 20 and 21. One arm of the bell crank 20 is pivoted to the flattened lower end portion 11 of the bracket 10 by means of a pivot pin or the like as shown at 22. The other arm of the bell crank 20 extends rearwardly and cooperates with a similarly extending arm of the bell crank 21 as will presently appear. The bell crank 21 is preferably made up of an arm 23 which may be a casting, or the like and an arm 24 which may be in the form of a screw threaded bolt having threaded engagement with a tapped boss 25 provided in the arm 23. The bolt arm 24 is thus capable of being lengthened or shortened by being screwed out or in as may be desired. The outer end of the arm 24 is pivoted to the outer end of the arm 19 of the bell crank 15 as indicated at 26, the pivotal connection 26 including a journal lock 27 which is pivoted between the arms 19ª and 19ᵇ of the arm 19, the said member 27 being provided with an opening rotatably receiving the bolt arm 24. A nut 28 is pinned to the bolt 24 immediately above the journal 27, and a lock nut 29 threadedly engages the lower end of the said bolt to lock the bolt against rotation in the journal 27.

The bell cranks 20 and 21 are pivoted together intermediate their ends as shown at 30, the bell crank 21 being provided with an ear 31 which fits between the plates 20ª and 20ᵇ which constitute the bell crank 20. The plates 20ª and 20ᵇ are maintained in spaced relation by being located on opposite sides of the flattened portion 11 of the bracket, and also by means of a spacing sleeve 32 through which a rivet 33 extends as clearly shown in Fig. 2.

The bell cranks 20 and 21 being pivoted together and provided with rearwardly extending arms in overlapping arrangement as shown, are capable of buckling rearwardly but not forwardly. The rearwardly extending arms thus serve as stops for limiting forward buckling.

For normally maintaining the parts in the position shown in Fig. 1, I provide a spring arrangement connected between the rearwardly extending arms of the bell cranks 20 and 21, this means including a bolt 34 which is provided with an eye 35 at its lower end and pivotally connected to the arm 23 by means of a pin 36. The arm 23 is provided with an opening as clearly shown to receive the eye part 35, and the bolt 34 extends upwardly between the plates 20ª and 20ᵇ of the bell crank 20. A spring seat 37 is slidably mounted on the bolt 34 and provided with depending ears 38 having rounded lower ends adapted to be seated in correspondingly shaped seats 39 provided in the rearwardly extending arm of the bell crank 20. A coil spring 40 is seated on the member 37 extending upwardly around the bolt 34 and is confined on the bolt by means of a nut and washer 41 whereby the spring may be compressed to the desired extent.

It will be understood that the expansive force of the spring 40 tends to maintain the rearwardly extending arms of the bell cranks 20 and 21 in engagement as shown in Fig. 1 and the other arms thereof in approximate alignment. As shown in Fig. 1, the arrangement is preferably such that the centers of the pivotal connections 22, 30 and 26 are sufficiently out of alignment to permit the bell crank toggle arrangement to buckle when force is applied against the shovel or arm 14 of the bell crank 15. When force is applied against the shovel as by means of an obstruction in its path of travel through the ground, the bell crank 15 is caused to swing rearwardly so that the arm 19 thereof swings upwardly to cause the toggle mechanism to buckle in the manner shown in Fig. 5. In Fig. 5, the shovel 12 is shown in a swung-back position only a comparatively small distance in back of its normal operative position as shown in Fig. 1. Obviously, the shovel may swing back a considerably greater distance, the arrangement being preferably such that the shovel may swing to a position somewhat in the rear of the bracket 10 so that the shovel assumes an upwardly and forwardly inclined position wherein it may readily ride over such obstructions as it may engage. When the shovel is released from the obstruction, the spring 40 restores the same to its normal position, the overlapping rearwardly extending arms of the bell cranks 20 and 21 serving to limit forward movement of the shovel and to position the same in its said normal operative position.

The normal operative positions of the shovel may easily and quickly be adjusted by turning the bolt 24 through the agency of the pinned on nut, thereby to lengthen the distance between the centers 30 and 26, this adjusted position being maintained by means of the lock nut as above described.

As shown in Figs. 1, 3 and 5, the shovel is mounted on the stem or arm 14 of the bell crank 15 by means of the bolt 16 and a nut 42. The head of the bolt 16 is preferably squared to fit the square opening 13 and the back of the arm 14 is flattened as shown in 43 to form a seat for the nut 42. Also the front of the arm 14 is more or less flattened to provide a seat 44 for receiving the back of the shovel 12 whereby rigid mounting of the shovel is facilitated.

In some instances, cultivator shovels are secured to the mounting arms by means of clasp-on devices, one example of such a clasp-on device being shown in Figs. 6 and 7 wherein the shovel is indicated at 12ª. The clasp-on device includes a bracket 44' which is riveted to the shovel 12ª as indicated at 45 and 46, and provided with transversely spaced ears 47 and 48. Arcuate clasp members 49 and 50 provided with end portions 51 and 52 which hook behind the respective ears 47 and 48, fit around the arm portion 14 and are adapted to be clamped thereon by means of a clamping bolt 53 which extends through the ears 54 and 55 of the respective clasp members as clearly shown in Fig. 7. It will be understood that the arm portion 14 is generally cylindrical in form as shown so that the clasp may be secured on the stem in any angular position, thereby enabling the shovel to be similarly adjusted to suit the preference of the farmer, and that the flattened seats above mentioned will not interfere with the use of the clasp-on mechanism just described in that the side portions of the arm 14 maintain their cylindrical surface substantially throughout their lengths. By the above described structure of the arm 14 of the bell crank, the two types of shovel described may be interchangeably mounted on the implement, this being a highly desirable advantage.

I am aware that changes may be made in the above described structure without departing from the spirit of my invention, the scope of which should be determined by reference to the following claims, construing the same as broadly as possible consistent with the state of the art.

I claim as my invention:

1. In a mounting for a cultivator shovel or the like, the combination of a main support, a bell crank foot piece pivoted intermediate its ends to said support, one of the arms of said foot piece being adapted to have a shovel or the like secured thereto, toggle mechanism extending between and connecting the other arm of said foot piece and a point in the length of said support spaced upwardly from the pivotal connection between the foot piece and support, said toggle mechanism including a pair of pivotally connected parts provided with means for limiting relative pivotal movement therebetween in one direction, spring means urging said toggle parts toward said limit of relative pivotal movement, said spring and toggle mechanism serving to yieldingly maintain the shovel in predetermined operative position, the connection between said toggle and said foot piece including an adjusting screw constituting part of the length of the one of said toggle parts which is connected to said other arm of the foot piece, said screw being mounted in one of the parts which it connects so as to be rotatable therein but longitudinally stationary relative thereto and having threaded engagement with the other part, whereby rotation of said screw is operative to adjust the length of said toggle part to thereby adjust the normal operative position of the shovel.

2. In a mounting for a cultivator shovel or the like, the combination of a main support, a bell crank foot piece pivoted intermediate its ends to said support, one of the arms of said foot piece being adapted to have a shovel or the like secured thereto, toggle mechanism extending between the other arm of said foot piece and a point in the length of said support spaced upwardly from the pivotal connection between the foot piece and support, said toggle mechanism including a pair of pivotally connected parts provided with means for limiting relative pivotal movement therebetween in one direction, spring means urging said toggle parts toward said limit of relative pivotal movement, said spring and toggle mechanism serving to yieldingly maintain the shovel in predetermined operative position, the connection between said toggle and said foot piece including an adjusting screw constituting a portion of the toggle part which is connected to the foot piece, said screw being rotatably mounted on said foot piece in longitudinally fixed relation thereto and having threaded engagement with the toggle part of which the screw constitutes a portion, the effective length of said toggle being adjustable through the agency of said screw so as to adjust the normal operative position of the shovel.

HARRY RANDALL TRAPHAGEN.